(12) United States Patent
Aftanas et al.

(10) Patent No.: US 10,166,930 B2
(45) Date of Patent: Jan. 1, 2019

(54) ADJUSTABLY POSITIONABLE CARGO BOX AND LOAD RESTRAINING BAR SYSTEM FOR PICKUP TRUCK BED

(71) Applicant: JAC Products, Inc., Saline, MI (US)

(72) Inventors: Jeffrey M. Aftanas, Ortonville, MI (US); Gerard J. Kmita, Allen Park, MI (US)

(73) Assignee: JAC Products, Inc., Saline, MI (US)

( * ) Notice: Subject to any disclaimer, the term of this patent is extended or adjusted under 35 U.S.C. 154(b) by 108 days.

(21) Appl. No.: 15/065,361

(22) Filed: Mar. 9, 2016

(65) Prior Publication Data

US 2016/0311377 A1    Oct. 27, 2016

Related U.S. Application Data

(60) Provisional application No. 62/151,096, filed on Apr. 22, 2015.

(51) Int. Cl.
*B60R 9/00* (2006.01)
*B60R 9/06* (2006.01)
*H02S 20/30* (2014.01)
*H02S 40/38* (2014.01)

(52) U.S. Cl.
CPC .............. *B60R 9/065* (2013.01); *H02S 20/30* (2014.12); *H02S 40/38* (2014.12)

(58) Field of Classification Search
CPC .......... B60R 9/065; H02S 20/30; H02S 40/38
USPC ................................................. 224/403, 404
See application file for complete search history.

(56) References Cited

U.S. PATENT DOCUMENTS

| | | | |
|---|---|---|---|
| 4,522,326 A * | 6/1985 | Tuohy, III | B60R 11/06 224/310 |
| 5,169,200 A | 12/1992 | Pugh | |
| 5,460,304 A | 10/1995 | Porter et al. | |
| 6,068,319 A | 5/2000 | O'Brien | |
| 6,253,976 B1 * | 7/2001 | Coleman | B60R 9/00 224/281 |
| 6,464,277 B2 * | 10/2002 | Wilding | B60R 9/00 224/404 |
| 7,052,066 B2 * | 5/2006 | Emery | B60R 11/06 296/37.1 |
| 7,128,356 B2 * | 10/2006 | Bassett | B60R 11/06 296/37.6 |
| 8,177,110 B1 * | 5/2012 | Hines, Jr. | B60R 11/06 224/403 |

(Continued)

*Primary Examiner* — Peter Helvey
(74) *Attorney, Agent, or Firm* — Harness, Dickey & Pierce, P.L.C.

(57) ABSTRACT

A cargo supporting and restraining system is disclosed for use within a cargo area of a vehicle. The system may have a pair of support rails fixedly secured to opposing interior wall surfaces of a pair of sidewalls of a vehicle cargo area. A load bar assembly may be used which has a generally U-shaped frame, and which is supported for sliding movement and adjustable positioning along the support rails. A locking system may be associated with the load bar assembly for locking the load bar assembly at a desired longitudinal position along the support rails. A cargo box assembly may also be provided which is removably secured to the load bar assembly. A locking assembly is operably associated with the cargo box assembly for locking the cargo box to the load bar assembly to prevent removal of the cargo box assembly.

20 Claims, 18 Drawing Sheets

(56) References Cited

U.S. PATENT DOCUMENTS

| | | |
|---|---|---|
| 8,348,331 B2 | 1/2013 | Holt |
| 8,544,708 B2 | 10/2013 | Maimin |
| 2006/0279099 A1 | 12/2006 | Ranka et al. |

* cited by examiner

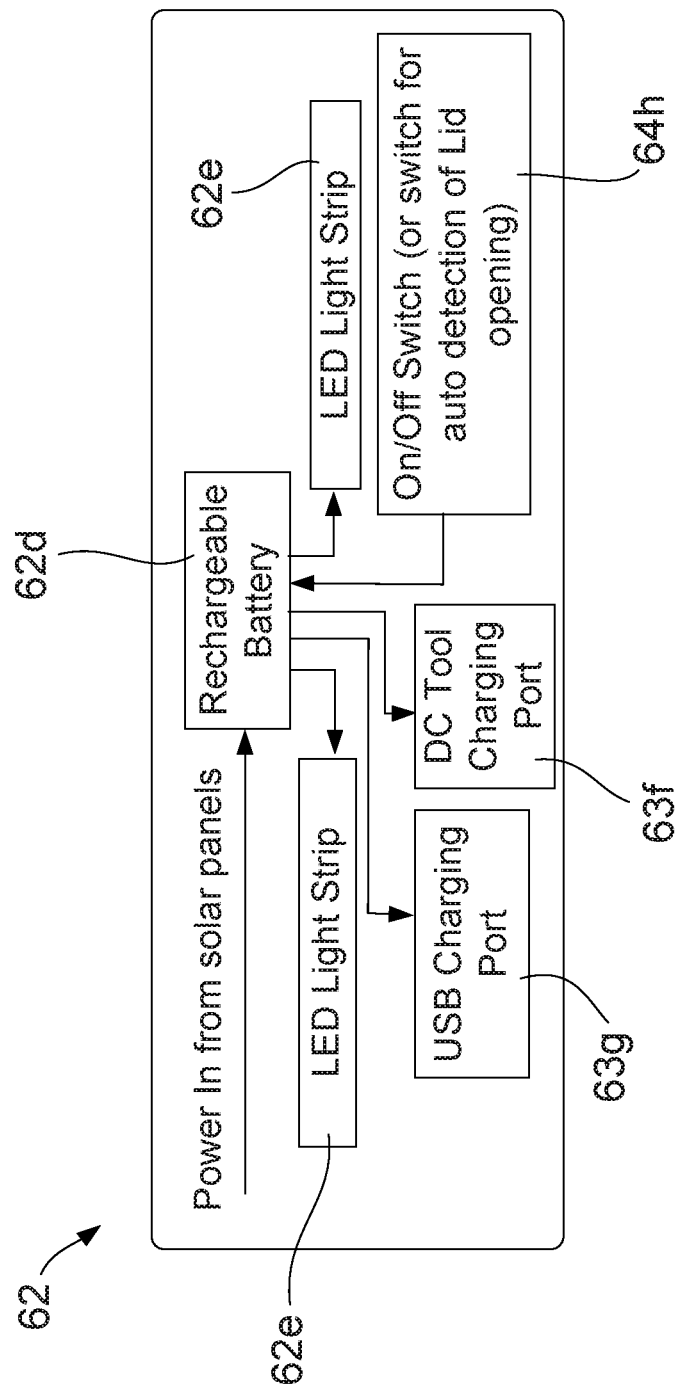

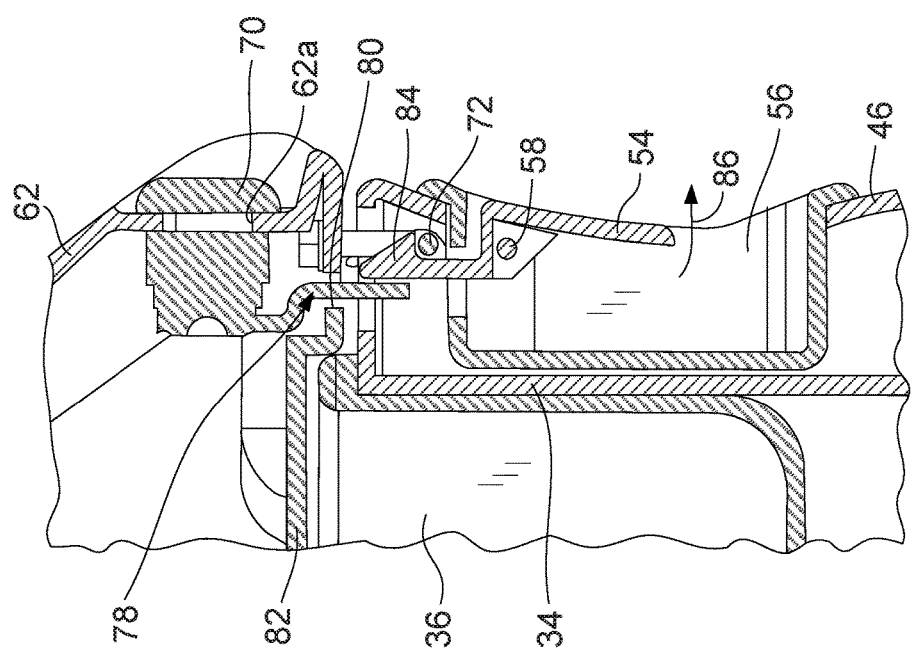

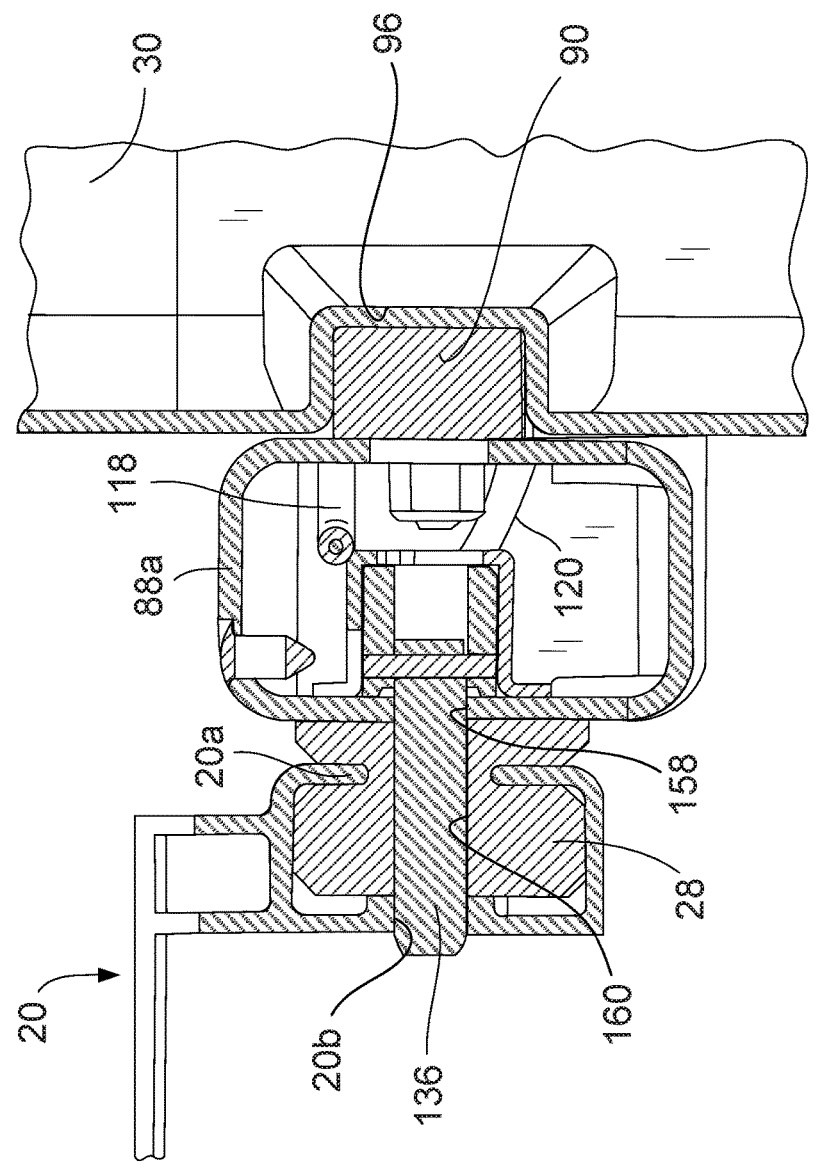

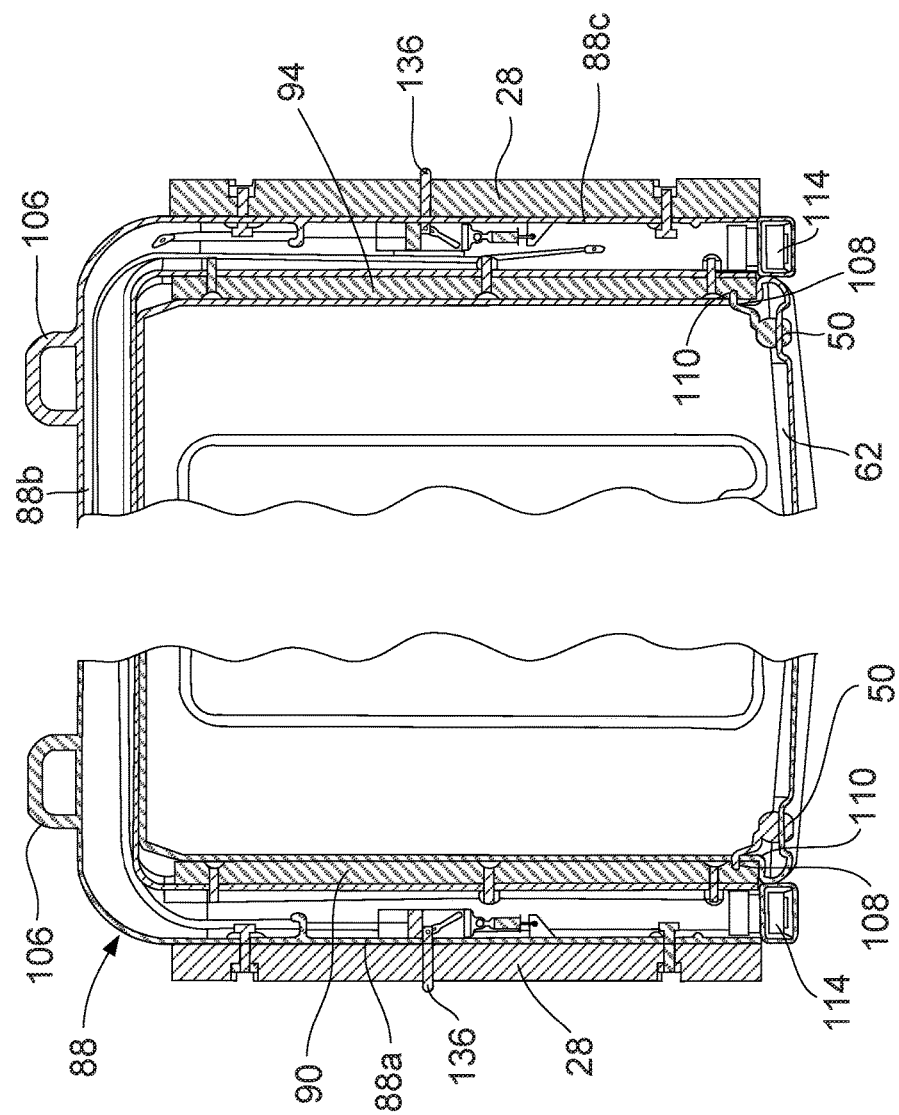

ADJUSTABLY POSITIONABLE CARGO BOX AND LOAD RESTRAINING BAR SYSTEM FOR PICKUP TRUCK BED

CROSS-REFERENCE TO RELATED APPLICATIONS

This application claims the benefit of U.S. Provisional Application No. 62/151,096, filed on Apr. 22, 2015. The entire disclosure of the above application is incorporated herein by reference.

FIELD

The present disclosure relates to article carrying systems for use on motor vehicles, and more particularly to an adjustably positionable cargo box that is especially well adapted for use in a bed of a vehicle such as a pickup truck, and which includes a load bar for supporting the cargo box, and where the load bar can be uncoupled from the cargo box and used independently to restrain larger articles in the bed against movement.

BACKGROUND

The statements in this section merely provide background information related to the present disclosure and may not constitute prior art.

Transporting articles within the bed of a pickup truck have often proven challenging because of the tendency for articles to move around in the bed as the vehicle accelerates, brakes and turns. Often individuals have resorted to using bungee cords or nylon tie down straps to help restrain articles in the bed of a pickup truck. Other solutions have involved fixedly supported tool boxes or cargo boxes which are typically mounted just rearwardly of the cab of the pickup truck. Such solutions, while proving somewhat effective, do not provide the versatility of having an adjustably positionable cargo box which can be quickly and easily repositioned within the bed at a desired position. Still further, such systems are not able to act as load restraining components to hold larger cargo items in place with the truck bed. Accordingly, there is still a need for a cargo box and restraining system which not only allows smaller cargo items to be held in a cargo box, but which has the added functionality of being quickly and easily repositionable within the bed, or alternatively or being configured to act as a bed divider and/or load restraining component to restrain larger loads within a given portion of the pickup truck bed.

SUMMARY

In one aspect the present disclosure relates to a cargo supporting and restraining system for use within a cargo area of a vehicle. The system may comprise a pair of support rails fixedly secured to opposing interior wall surfaces of a pair of sidewalls of a vehicle cargo area. A load bar assembly may be included which has a generally U-shaped frame, and which is supported for sliding movement and adjustable positioning along the support rails. A locking system may be associated with the load bar assembly for locking the load bar assembly at a desired longitudinal position along the support rails. A cargo box assembly may also be included which is removably secured to the load bar assembly. A locking assembly is operably associated with the cargo box assembly for locking the cargo box to the load bar assembly to prevent removal of the cargo box assembly.

In another aspect the present disclosure relates to a cargo supporting and restraining system for use within a cargo area of a vehicle. The system may comprise a pair of support rails fixedly secured to opposing interior wall surfaces of a pair of sidewalls of a vehicle cargo area. A load bar assembly may be included which has a generally U-shaped frame, and which is supported for sliding movement and adjustable positioning along the support rails. A locking system may be included which is associated with the load bar assembly for locking the load bar assembly at a desired longitudinal position along the support rails. The locking system may include a first latch handle, a second latch handle, and at least one cable operatively connecting the latch handles. At least one latching assembly is mounted in a portion of the U-shaped frame of the load bar assembly to secure the load bar assembly at a desired longitudinal position along the support rails. Movement of either one of the first or second latch handles from a latched position to an unlatched position operates to release the at least one latching assembly from engagement with the frame, thus enabling movement of the load bar assembly along the support rails. A cargo box assembly is also included which is removably secured to the load bar assembly.

In still another aspect the present disclosure relates to a cargo supporting and restraining system for use within a cargo area of a vehicle. The system may comprise a pair of support rails fixedly secured to opposing interior wall surfaces of a pair of sidewalls of a vehicle cargo area. A load bar assembly may be included which has a generally U-shaped frame, and which is supported for sliding movement and adjustable positioning along the support rails. A locking system is associated with the load bar assembly for locking the load bar assembly at a desired longitudinal position along the support rails. The locking system may include a first latch handle, a second latch handle, and at least one cable operatively connecting the latch handles. At least one latching assembly is mounted in a portion of the U-shaped frame of the load bar assembly to secure the load bar assembly at a desired longitudinal position along the support rails. Movement of either one of the first or second latch handles from a latched position to an unlatched position operates to release the at least one latching assembly from engagement with the frame, thus enabling longitudinal movement of the load bar assembly along the support rails. A cargo box assembly is slidably supported on first and second portions of the frame of the load bar assembly. The cargo box assembly is removably secured to the load bar assembly for removal from the load bar assembly.

A lid is pivotally secured to the cargo box assembly and movable between an open position and a closed position. A locking mechanism is disposed on the lid for locking the lid in a closed position. A solar panel disposed on the lid, and a rechargeable battery is disposed in the carbo box assembly and in electrical communication with the solar panel to be recharged by the solar panel. A charging port is operably associated with the rechargeable battery.

BRIEF DESCRIPTION OF THE DRAWINGS

The drawings described herein are for illustration purposes only and are not intended to limit the scope of the present disclosure in any way.

FIG. 6a shows a high level plan view of an undersurface of the lid of FIG. 6 with various components that may be integrated into the lid's construction shown in block diagram form;

FIG. 7 is a side cross sectional view taken generally in accordance with section line 7-7 in FIG. 1 showing the latching assembly used to secure the lid of the cargo box assembly;

FIG. 10a is a cross sectional view similar to that shown in FIG. 10 but also showing the load bar assembly being supported from one of the support rails;

FIG. 11 is a simplified top plan view illustrating the engagement of the locking assemblies at opposing sides of the cargo box assembly with the load bar assembly;

DETAILED DESCRIPTION

Figure 1:
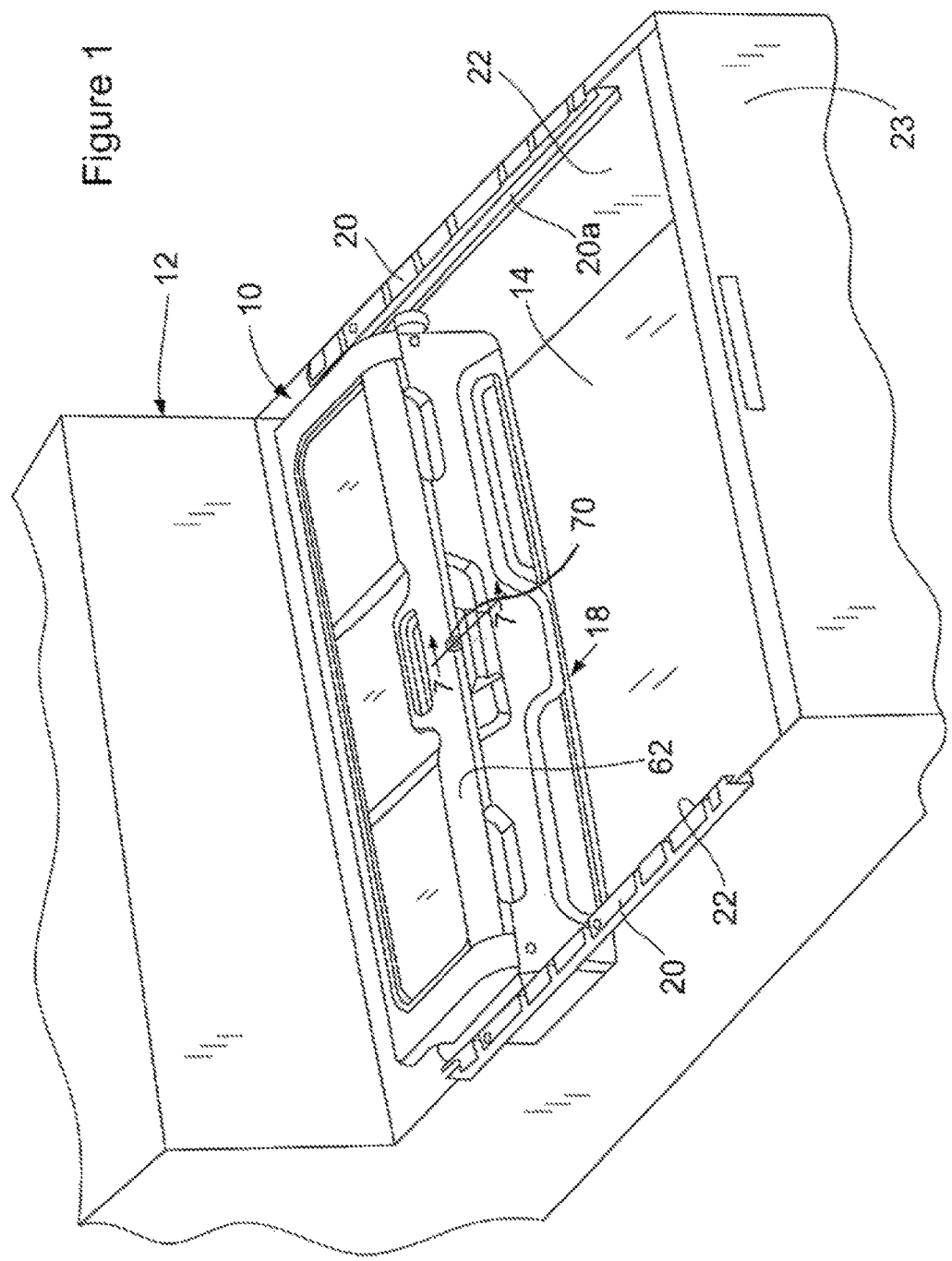
FIG. 1 is a perspective view of one embodiment of an adjustably positionable cargo box and load restraining bar system for use with a vehicle, in this example a pickup truck, in accordance with the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1 there is shown an adjustably positionable cargo box and load restraining system 10 in accordance with one embodiment of the present disclosure (hereinafter simply "system 10"). System 10 is shown positioned in a bed 14 of a motor vehicle 12. In this example the motor vehicle is a pickup truck, although it will be appreciated that the vehicle may be a van, SUV or any other type of vehicle where both small and larger cargo items may need to be stored and/or restrained against movement while the vehicle is travelling. As such, the system 10 is not restricted to use with only pickup trucks, and is therefore expected to find applications in other types of vehicles as well.

The system 10 makes use of a load bar assembly 26 which is detachably secured to a cargo box assembly 18, and which supports the cargo box assembly 18 therefrom. A pair of support rails 20 is fixedly secured to opposing sidewalls 22 of the bed 14. The support rails 20 have outwardly opening C-shaped tracks 20a that engage portions of the load bar assembly 26 which enables the load bar assembly to support the cargo box assembly 18 therefrom, and also to enable adjustable positioning of the cargo box assembly at different locations along the longitudinal length of the bed 14.

Figure 2:
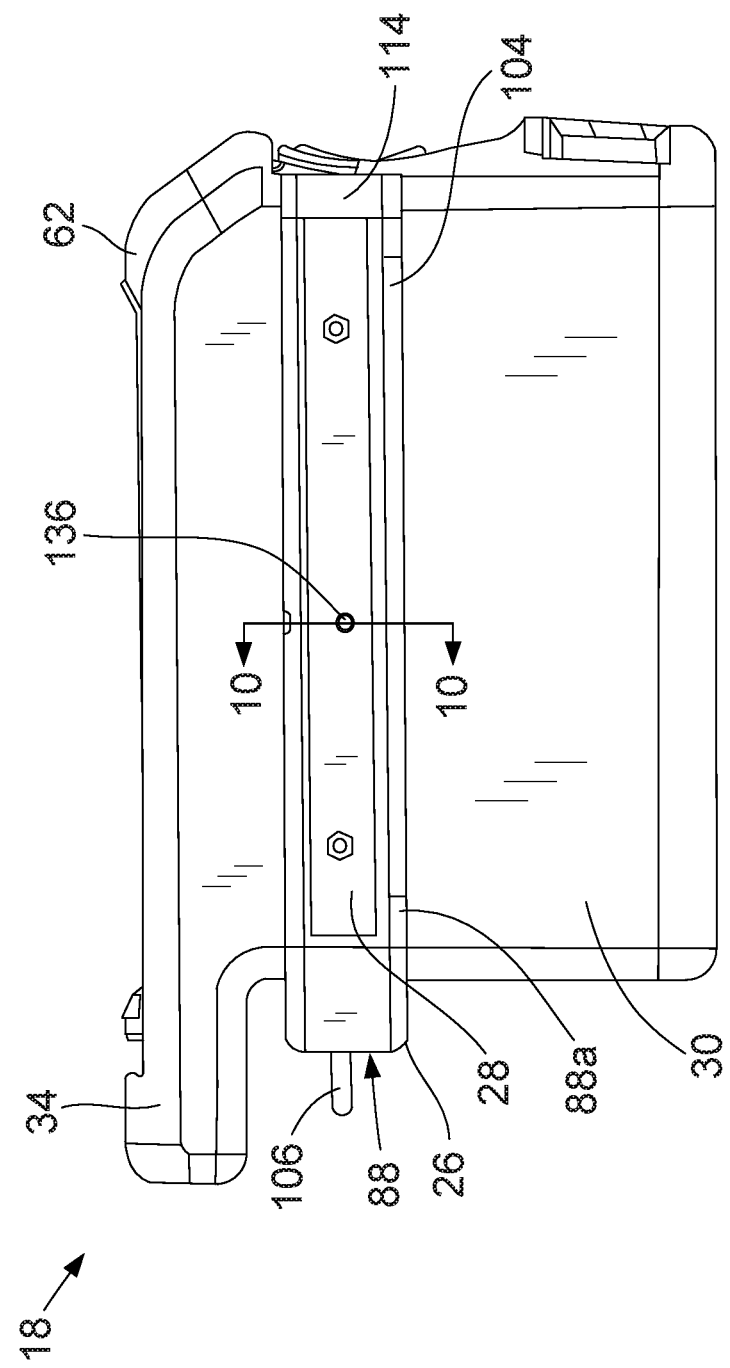
FIG. 2 is a side elevational view of just the cargo box assembly of FIG. 1.
Figure 3:
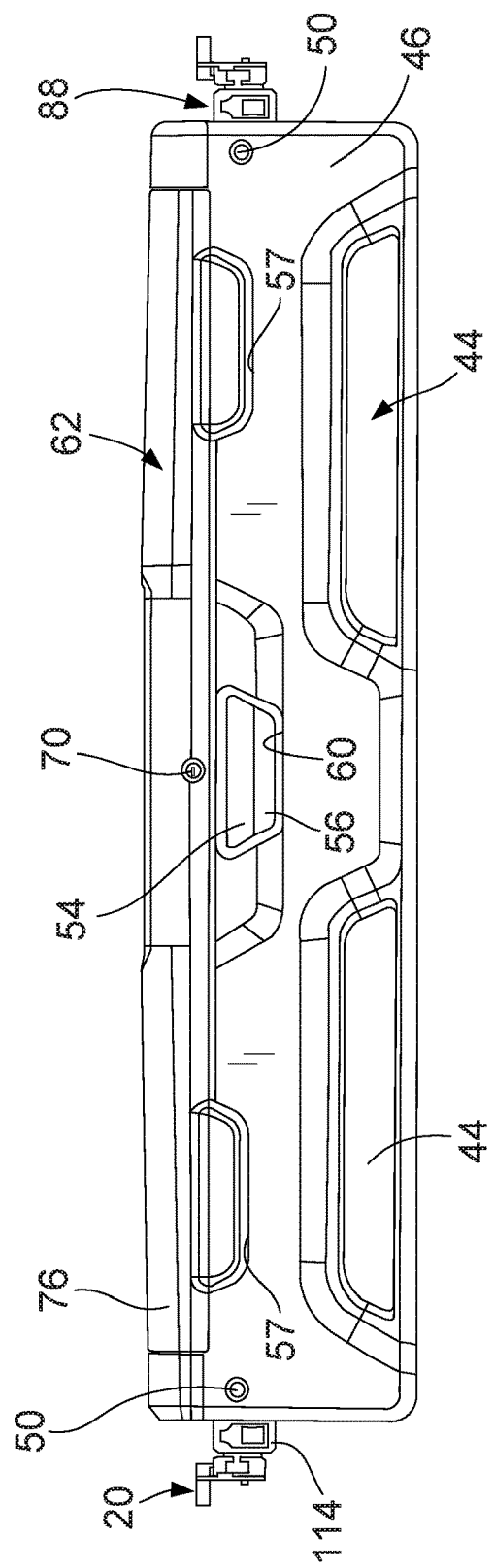
FIG. 3 is a front elevational view of just the cargo box assembly of FIG. 2.
Figure 4:
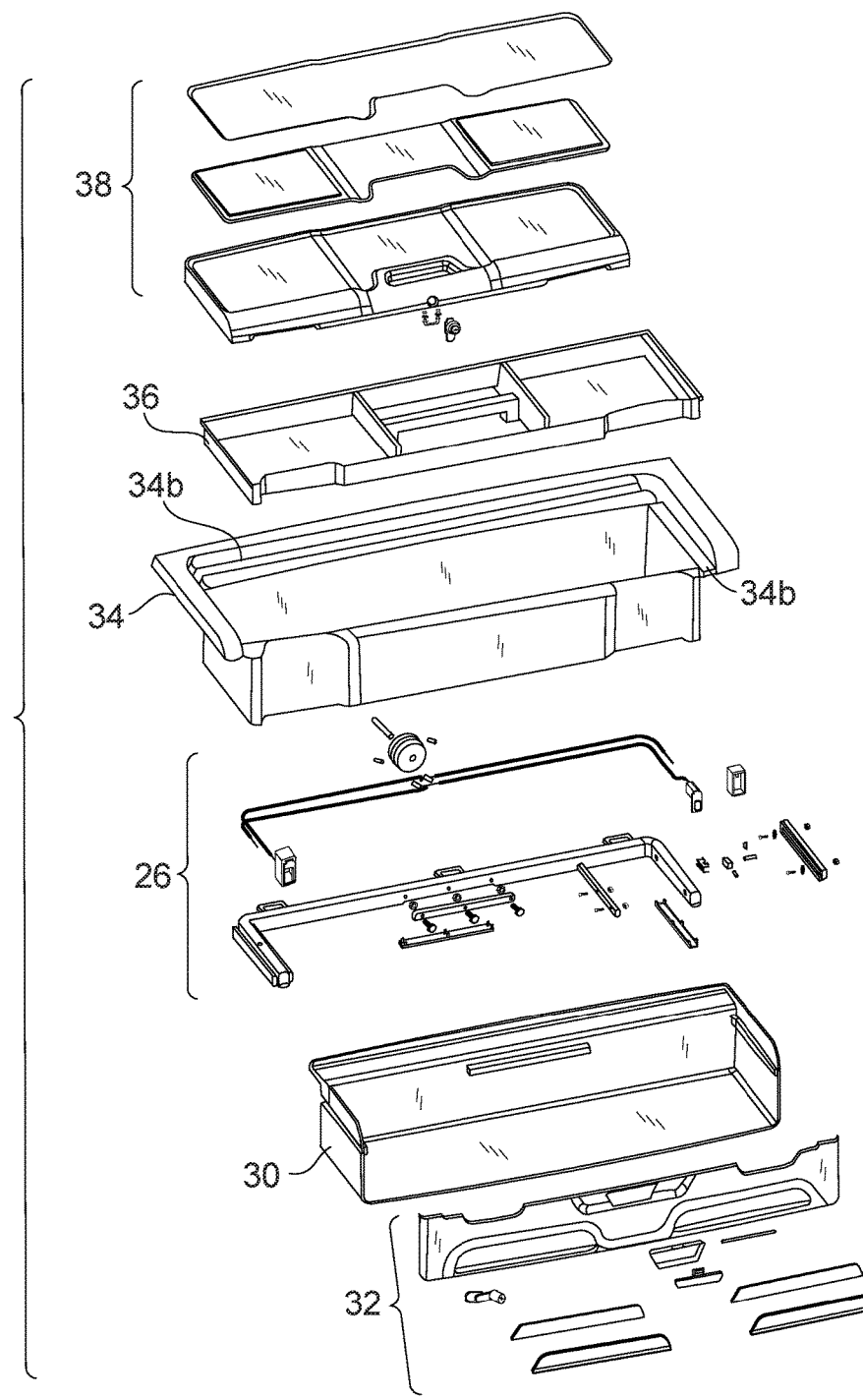
FIG. 4 is an exploded perspective view of various components making up the cargo box assembly.

The construction of the cargo box assembly 18 can be seen in greater detail in FIGS. 2, 3 and 4. The cargo box assembly 18 is detachably secured to the load bar assembly 26, which will be described in greater detail in the following paragraphs. This enables the cargo box assembly 18 to be detached from the load bar assembly 26 and removed completely from the system 10, thus freeing up more room in the bed 14 when the cargo box assembly 18 is not needed. This also enables the load bar assembly 26 to be used alone as a bed divider when the cargo box assembly 18 is detached and removed from the bed.

Referring specifically to FIG. 3, the load bar assembly 26 can be seen to be supported for sliding movement via slider bars 28, which in this example have a generally T-shaped cross sectional configuration, which each are captured in the C-shaped tracks 20a of the support rails 20. This enables the load bar assembly 26 to be slid along the tracks 20a and adjustably positioned at various points along the longitudinal length of the bed 14 as needed to support articles of widely varying shapes and sizes against movement when the vehicle 12 is travelling. The slider bars 28 are preferably made of nylon but virtually any suitable, relatively low friction material which is able to slide relatively easily along a metallic track, and which is resistant to the elements, may be used.

Referring to FIG. 4, the cargo box assembly 18 can be seen to include an outer box 30, a front box panel assembly 32 attachable to the outer box, the load bar assembly 26, an inner box 34 with a removable tray 36 and a lid assembly 38. The inner box 34 includes internal integrally formed ledges 34a that support the removable tray 36 therein.

Figure 5:
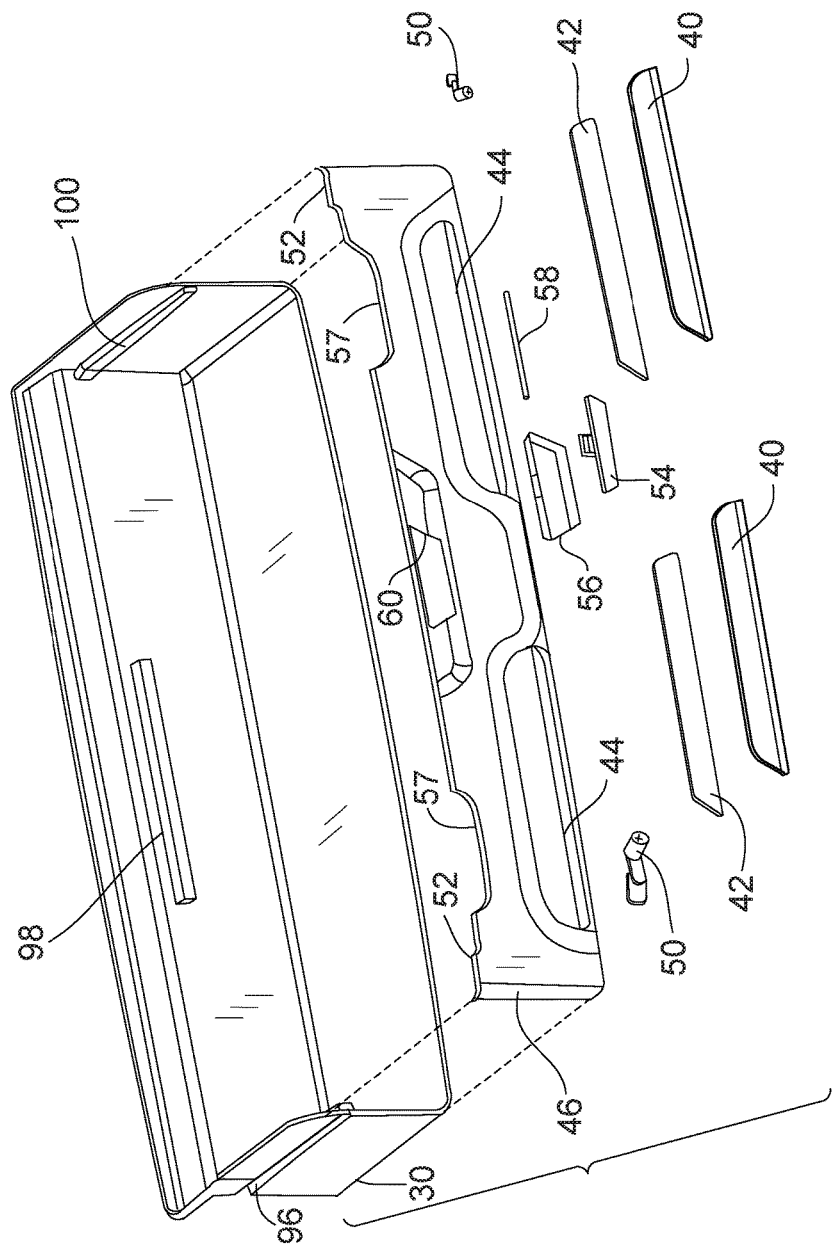
FIG. 5 is an exploded perspective view of components associated with the inner box of the cargo box assembly.

With reference to FIG. 5, the front box panel assembly 32 can be seen to include mounting rings 40 that circumscribe reflectors 42. The reflectors 42 are secured, such as by adhesives, within similarly shaped recesses 44 on a front panel element 46. The front panel element 46 is fixedly secured by adhesives or conventional threaded fasteners to a leading edge 48 of the outer box 30. A pair of key actuated locking assemblies 50 are disposed within openings 52 in the front panel element 46 and, when turned to an unlocked position, enable the entire outer box 30 to be slidably removed from the load bar assembly 26. This important feature will be described in further detail in the following paragraphs.

With further reference to FIGS. 3 and 5, a paddle latch 54 is pivotally mounted within a paddle latch housing 56 by a pivot pin 58. The assembly of the paddle latch 54 and the paddle latch housing 56 is disposed within an opening 60 in the front panel element 46. Cutout sections 57 in the front panel element 46 allow access to recesses 35 (FIG. 3) in the inner box 34 to aid in grasping and handling the cargo box assembly 18.

Figure 6:
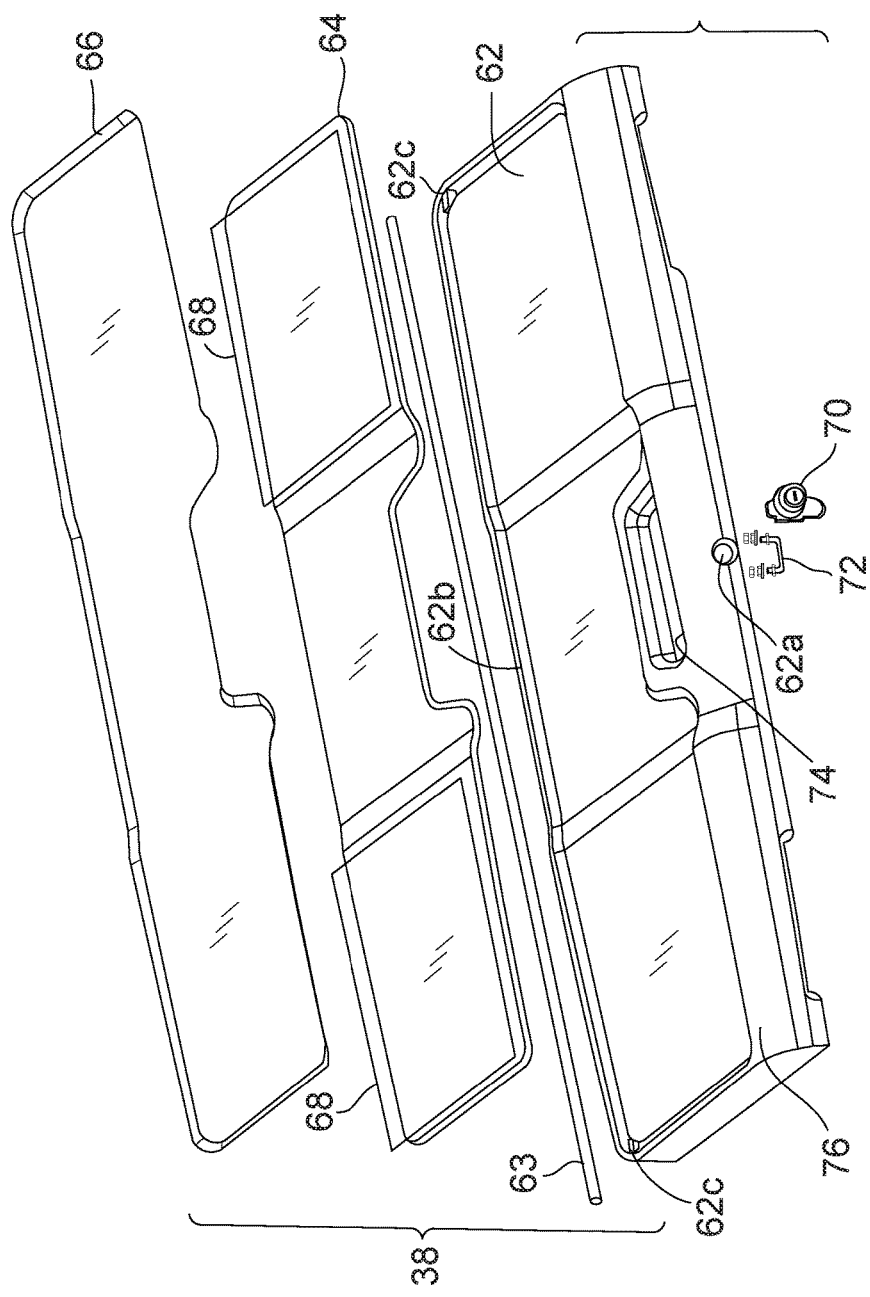
FIG. 6 is an exploded perspective view of components associated with the lid assembly of the cargo box assembly.

With reference to FIGS. 6 and 6a, the lid assembly 38 can be seen to include a lid 62, a lid mat 64 and a lid trim ring 66. Optionally, two or more solar panels 68 can be mounted on the lid mat 64 and associated electrical wiring (not shown) integrated into the inside area of the inner box 34 to enable the recharging of tool batteries from the inside of the inner box 34. FIG. 6a shows such an embodiment of the lid 62 where the lid 62 includes a rechargeable battery 62d mounted in a suitable compartment or recess. The solar panels 68 are electrically coupled to the battery 62d to recharge the battery. The battery 62d is electrically coupled to at least one LED light strip 63e, a DC tool charging port 63f, and optionally a USB charging port 63g for charging USB devices. An On/Off switch 64h may be included to enable a user to turn on and off the LED light strips 62e. Alternatively, the On/Off switch 64h may be a switch that detects the opening of the lid 62 and automatically turns on the LED light strips 62e when the lid 62 is opened, and automatically turns them off when the lid 62 is closed.

The lid assembly 38 further includes a key actuated lock 70 positioned within an opening 62a in the lid 62, and a U-bolt 72 which is secured by threaded fasteners to an undersurface area of the lid 62 to project downwardly below the undersurface area of the lid 62. A recess 74 may be formed in an upper surface 76 of the lid 62 to better enable a user to grasp the lid with one hand when lifting the lid into an open position. A rear upper edge 62b of the lid 62 may be secured using an elongated pivot rod 63 within a recessed area 34b of the inner box 34 (FIG. 4). The pivot rod 63 may extend through bores 62c at upper rear opposing areas of the lid 62. This enables the lid 62 to be pivotally opened and closed, but otherwise not detached from the inner box 34. Alternatively, the lid 62 may be secured with any other conventional components such as one or more hinges secured using threaded screws or even rivets.

With reference to FIG. 7, the key actuated lock 70 can be seen to include a lock tab 78 depending therefrom which is rotated along with rotational movement of a key inserted into the key actuated lock 70. The lock tab 78 protrudes through an opening 80 in a lower surface 82 of the lid 62 into the path of movement of a hook end 84 of the paddle latch 54. When the lock tab 78 is positioned as shown in FIG. 7, the paddle latch 54 will be prevented from opening if the user attempts to grasp it and pull outwardly in accordance with arrow 86 because of interference from the lock tab 78. As such, it will not be possible to open the lid 62. But when the key actuated lock 70 is rotated at least about 60 degrees, the lock tab 78 will be positioned clear of the hook end 84. This allows the paddle latch 54 to be pulled outwardly along the path of arrow 86, and hook end 84 will clear the U-bolt 72. The user will then be able to lift the lid 62 into its open position. Optionally, a torsion spring could be positioned over the pivot pin 58 to provide a biasing force that biases the paddle latch 54 into its locked position shown in FIG. 7.

Figure 8:
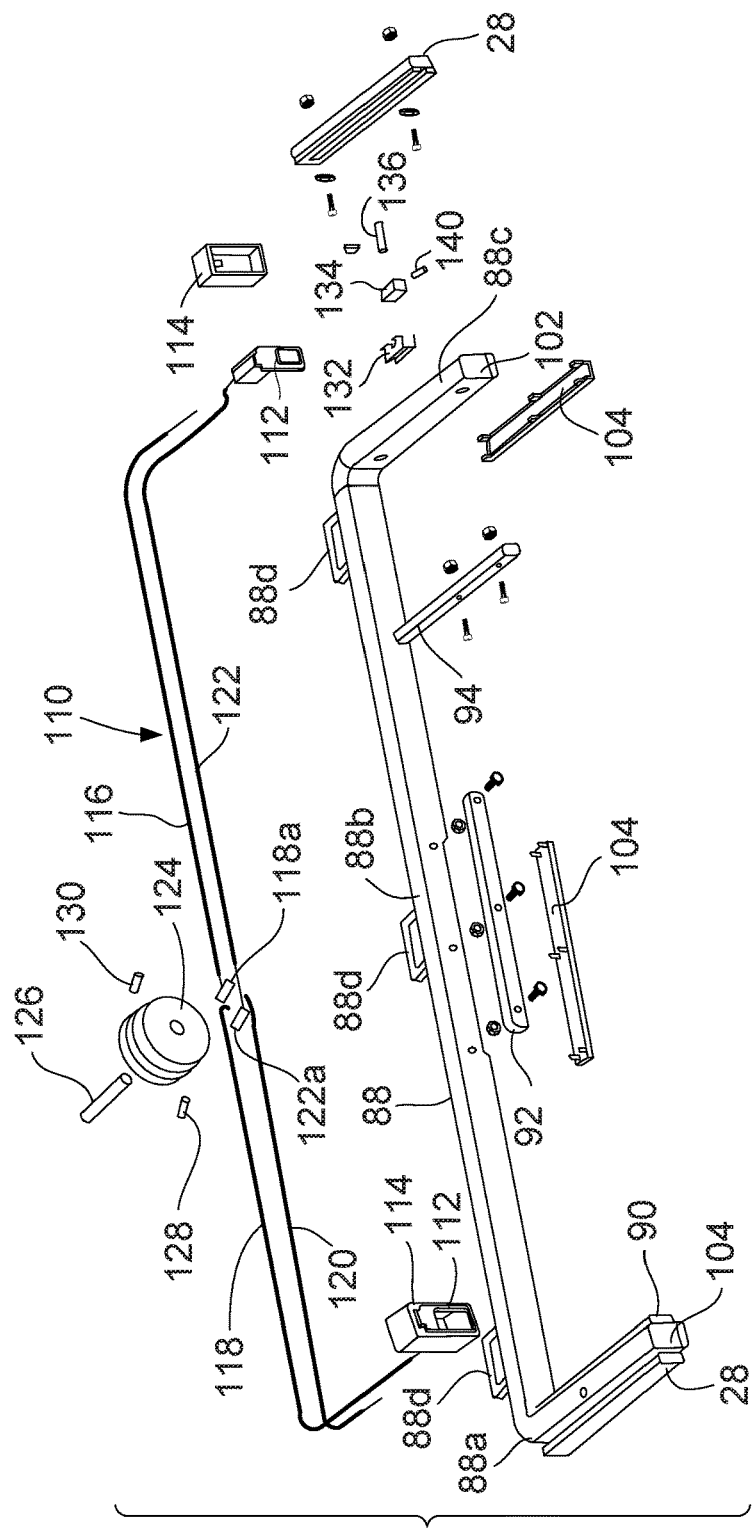
FIG. 8 is an exploded perspective view of various components associated with the load bar assembly.

With reference to FIG. 8 the various components of the load bar assembly 26 can be seen in greater detail. The load bar assembly 26 has a frame 88 having a generally U-shape, with an overall width dimension that enables the T-shaped slider bars 28 to engage within the tracks 20a of the support rails 20. A plurality of support blocks 90, 92 and 94, each made from rigid, structurally strong material such as nylon, may each be secured with threaded fasteners to frame sections 88a, 88b and 88c of the frame 88. With brief reference also to FIG. 5, the support blocks 90-94 shown in FIG. 8 may be used to engage recesses 96, 98 and 100, respectively, of the outer box 30 when the outer box is positioned within the load bar assembly 26. This enables the entire outer box 30, with the inner box 34 and tray 36, to be slidably removed from the load bar assembly 26 if needed. Optionally, one or more tie down brackets 88d may be affixed such as by threaded screws or any other suitable means to the frame 88, to thus provide points where external bungee cords or nylon straps may be attached.

Figure 9:
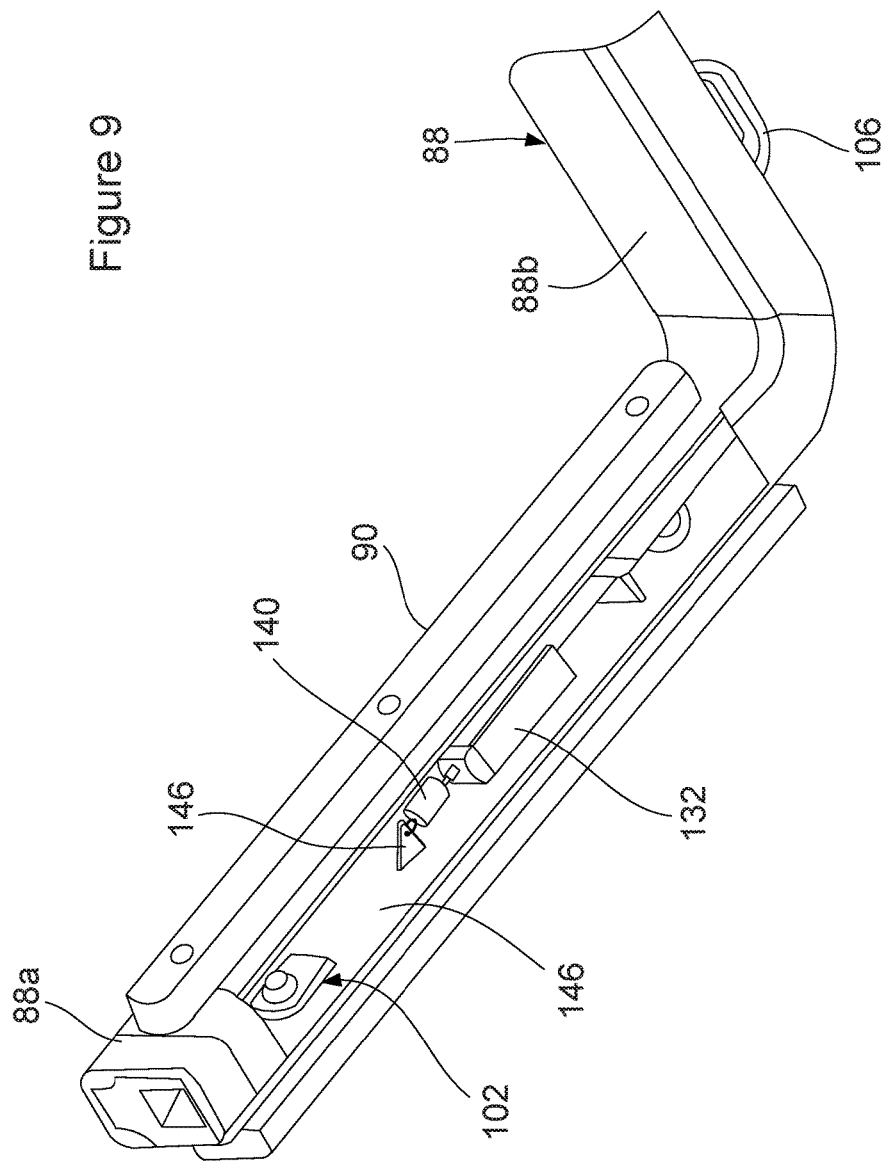
FIG. 9 is a perspective view of a portion of the load bar assembly illustrating a portion of an interior area thereof.
Figure 10:
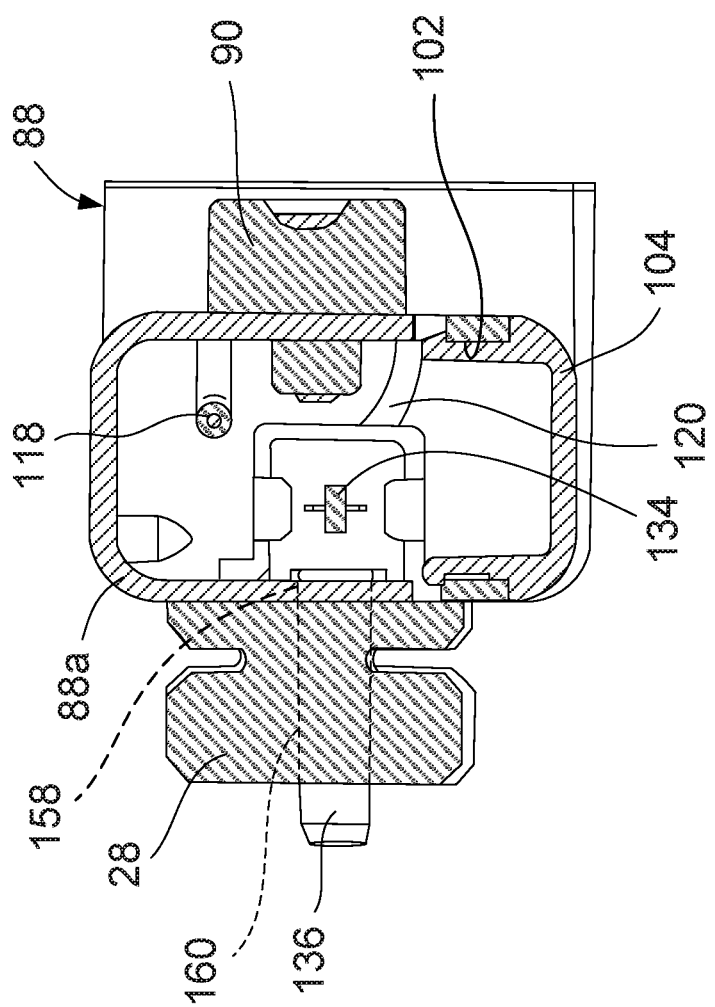
FIG. 10 is a cross sectional view taken generally in accordance with section line 10-10 in FIG. 2 further illustrating various components associated with the load bar assembly.

Referring further to FIGS. 8-10, the frame 88 has access openings 102 at the undersides of frame sections 88a, 88b and 88c which can be covered with removable access panels 104. A plurality of tie down loops 106 can be formed along an outer surface of frame section 88b of the frame 88, although only one of the tie down loops 106 is visible in FIG. 9.

With brief reference to FIG. 11, each of the support blocks 90 and 94 may include slots 108 that can be engaged by a latch arm 110 of each key actuated locking assembly 50 when the key actuated locking assembly is moved using a key into a locked orientation. In the locked orientation shown in FIG. 11, engagement of the latch arms 110 within the slots 108 prevents the outer box 30 from being removed from the load bar assembly 26. But when the key actuated locking assemblies 50 are both moved into their unlocked positions, the latch arms 110 will be rotated downwardly at least about 60 degrees to clear the slots 108, thus permitting the outer box 30 to be slid along the support blocks 90 and 94 toward the rear of the bed 14 (i.e., toward a tailgate 23 of the vehicle 12 as shown in FIG. 1)

Figure 12:
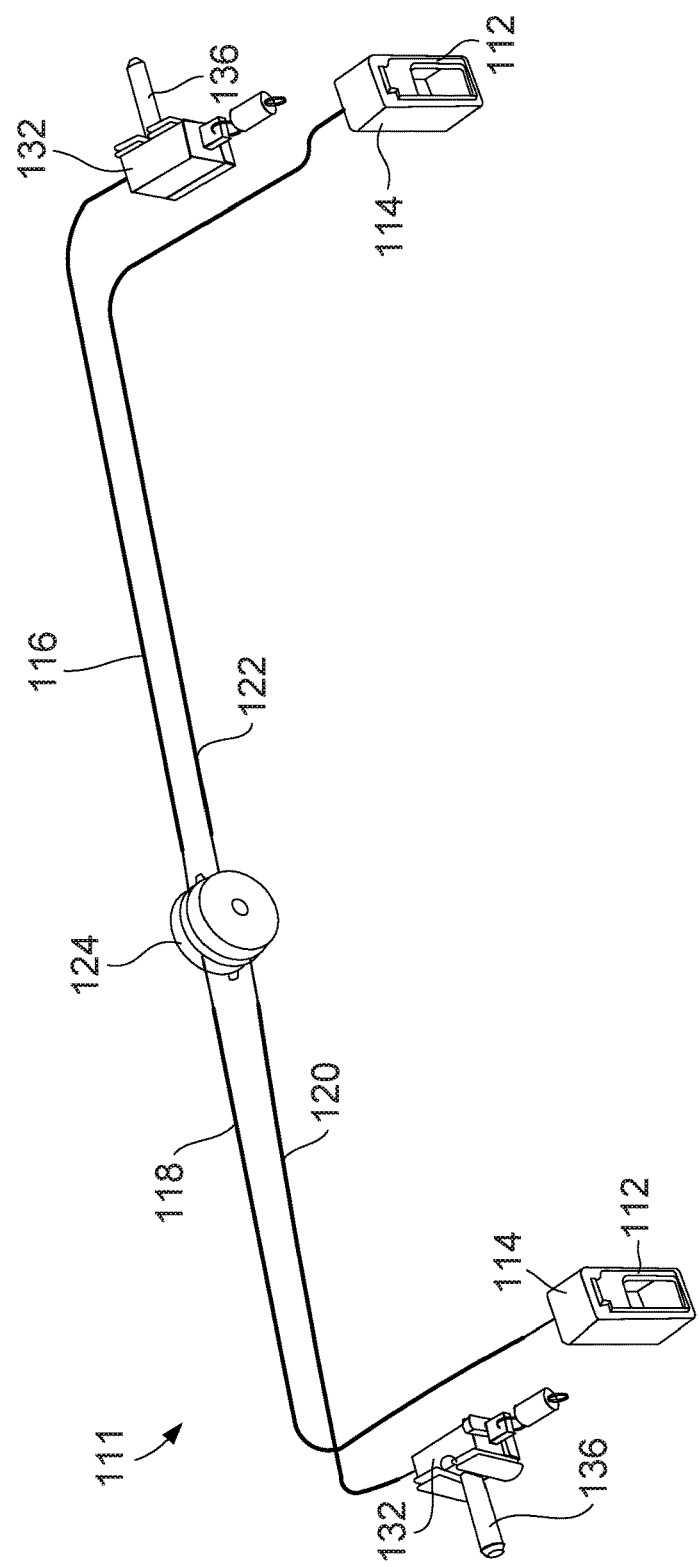
FIG. 12 is a high level perspective view of various components associated with the single side release system of the load bar system.

With further reference to FIGS. 8 and 12, the load bar assembly 26 can also be seen to include a single side release locking system 111 ("SSR system 111"). The SSR system 111 includes latch handles 112; latch handle housings 114; first, second third and fourth cables 116, 118, 120 and 122 respectively; a cam wheel 124 supported for rotation on a pivot pin 126; and a pair of springs 128 and 130. The latch housings 114 are secured in the open ends of frame sections 88a and 88c of the frame 88.

Figure 13:
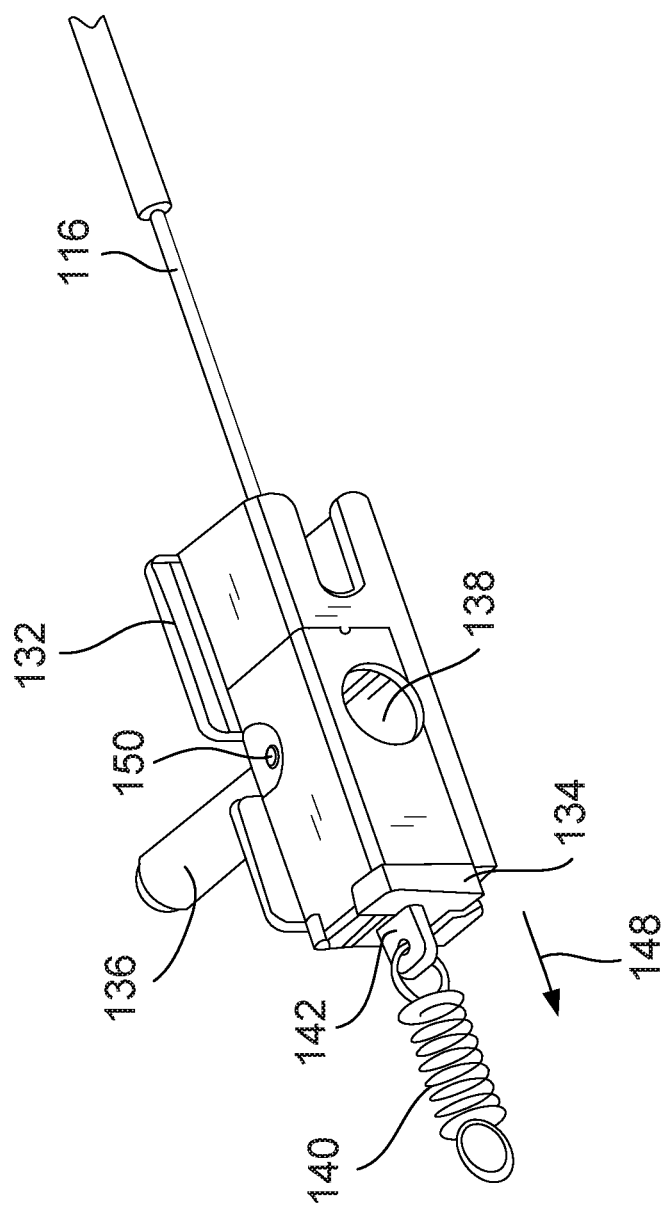
FIG. 13 is an enlarged perspective view of the latch slider, the latch bracket and the latch pin.

With reference to FIGS. 8, 12 and 13, each frame section 88a and 88c further includes a latch bracket 132 secured thereto (FIG. 8). The latch bracket 132 houses a latch slider 134 therein. A latch pin 136 extends transversely through a cutout 138 formed in the latch slider 134 (FIG. 13). A spring 140 is secured at one end to a tab 142 on the latch slider 134, and at the other end to a tab 144 formed on an inner surface 146 of its associated frame section 88a or 88c (FIG. 9).

Figure 14:
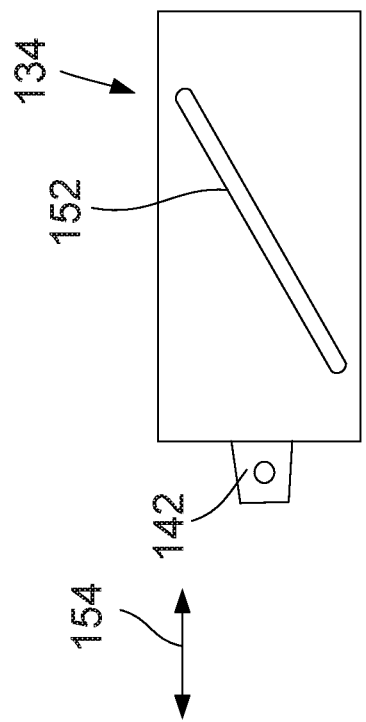
FIG. 14 is a top view of just the latch slider.
Figure 15:
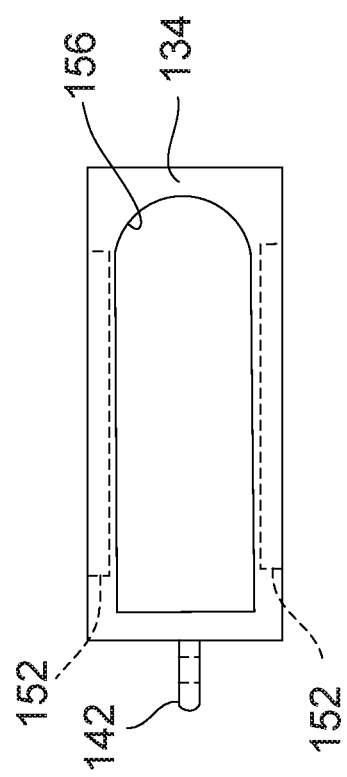
FIG. 15 is a side view of just the latch slider.

With reference to FIGS. 13, 14 and 15, the latch slider 134 is continuously biased in the direction of arrow 148 by the spring 140 (FIG. 13). The latch pin 136 is retained to the latch slider 134 by a pin 150. The opposing ends of the pin 150 extend through a pair of aligned diagonal slots 152 in the latch slider 134. This enables the latch pin 136 to be linearly withdrawn and extended perpendicular to the latch slider 134 as the latch slider moves back and forth in accordance with arrow 154 in FIG. 14. FIG. 15 illustrates that the cutout 138 provides clearance for the latch pin 136 as it is retracted partially into the latch slider 134.

With brief reference to FIGS. 10 and 10a, the latch pin 136 extends through an opening 158 in its associated frame section, in this view frame section 88a, as well as through a bore 160 in its associated the slider bar 28. The latch pin 136 is engaged in a hole 20b formed in the support rail 20. The same construction is present at frame section 88c, and therefore will not be repeated here. In this example the construction of the components 132, 134, 136, 150 and 140 form identical latching assemblies at each of frame sections 88a and 88c. When the latch pins 136 at both of frame sections 88a and 88c are engaged with their respective holes 22b, the load bar assembly 26 will be held securely stationary to the support rails 20.

Figure 16:
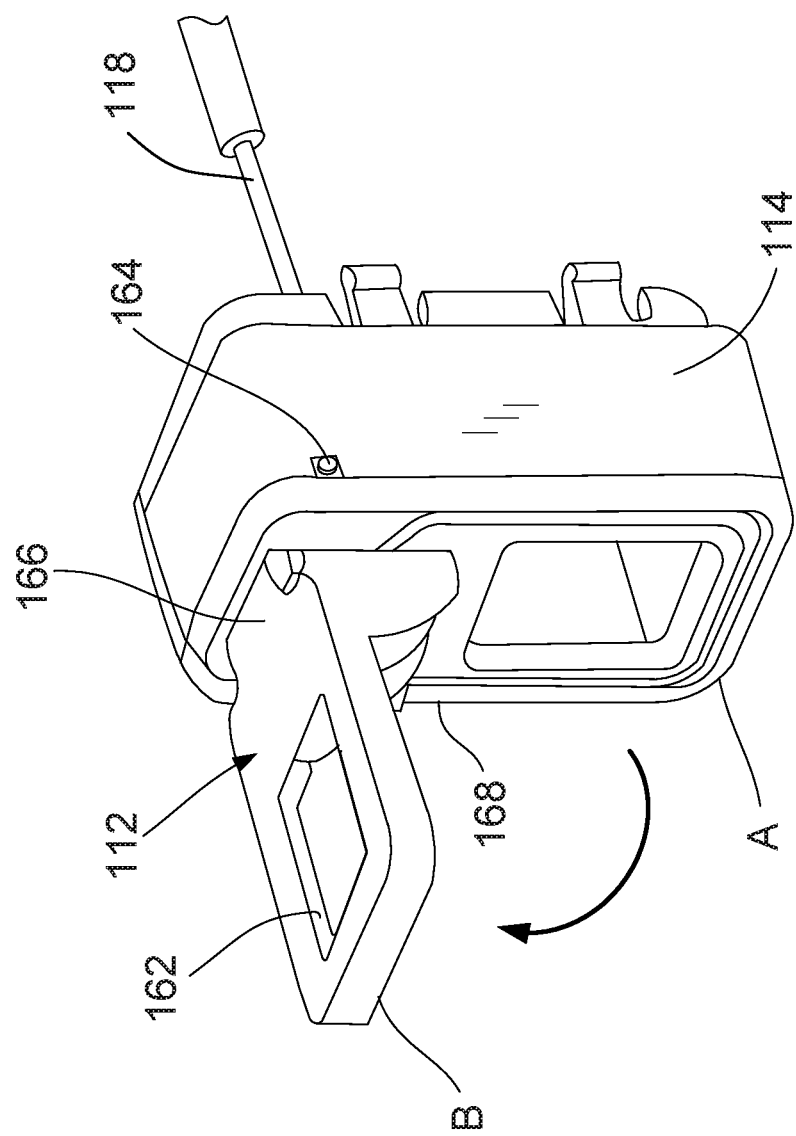
FIG. 16 is a perspective view of one of the pair of latch handle and latch housing assemblies which are used to simultaneously unlatch both opposing sides of the load bar assembly from the support rails.

With brief reference to FIG. 16, the construction of one of the latch handles 112 is shown in greater detail, with the latch handle shown in both its latched position (position A)

and its unlatched position (position B). The latch handle 112 has an opening 162 which may be grasped with one finger, and is pivotally mounted via a pivot pin 164 which extends through the latch handle housing 114 and through a neck portion 166 of the latch handle 112. A terminal end of cable section 122 is secured within an arcuate slot 168.

Figure 17:
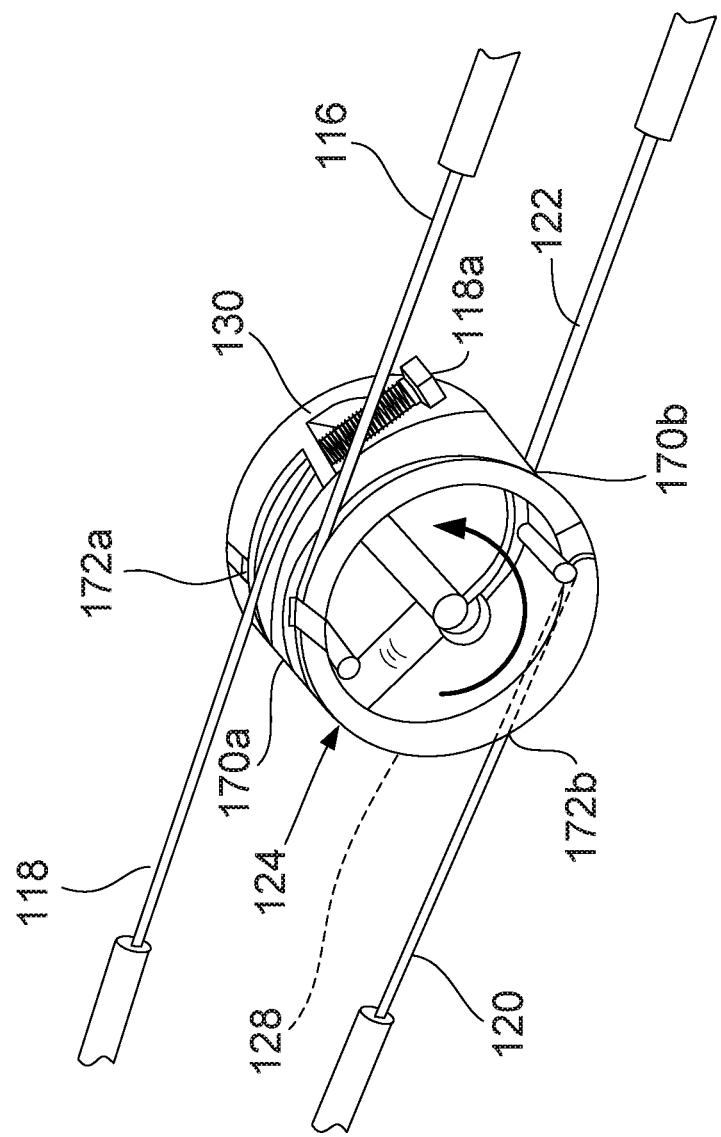
FIG. 17 is a high level perspective view of the cam wheel showing how the various cable assemblies are secured thereto.

With reference to FIGS. 12 and 17, in this example the latch handle housing 114 and latch handle 112 shown in FIG. 16 will be assumed to be associated with frame section 88c, and therefore will be the rightmost assembly 114/116 shown in FIG. 12. The latch handle 112 of the assembly 112/114 shown on the left side of the illustration in FIG. 12 has a terminal end of cable 118 secured thereto. FIG. 17 also shows that terminal ends of cables 116 and 122 are secured in channels 170a and 170b, in opposing orientations to the cam wheel 124. By "opposing orientations" it is meant that the terminal ends of the cables 116 and 112 are attached to lay over a top section and on a bottom section of the cam wheel so that rotation of the cam wheel 124 in one rotational direction causes the two cables 116 and 122 to move in opposite linear directions. The terminal ends of cables 118 and 120 are likewise positioned in channels 172a and 172b in opposing orientations so that rotational movement of the cam wheel 124 will cause the cables 118 and 120 to move in opposite linear directions. The cam wheel 124 is mounted for rotational movement via the pivot pin 126 within an interior area of frame section 88b, with access for assembly purposes being provided by access panel 104 (FIG. 8). The pivot pin 126 may be secured within parallel aligned bores (not shown) in the frame section 88c, and pivot pin 126 may be threaded for engagement with one or a pair of threaded nuts so as to be secured retained within the frame section 88a but still able to rotate about the pivot pin 126.

With further reference to FIGS. 8 and 17, the terminal end of cable 118 has an enlarged head portion 118a around which the spring 130 is positioned. Likewise, a terminal end of cable 122 has an enlarged head portion 122a about which spring 128 is positioned. The springs 128 and 130 help to provide a constant biasing force and to take up any slack in the cables 118 and 122. Cables 116 and 120 also have enlarged head portions similar to head portions 118a and 122a which are captured in openings adjacent channels 170 and 172.

From FIGS. 12 and 17, it will be apparent that lifting one latch handle 112 or the other at either frame section 88a or 88c into the unlatched position (position B in FIG. 16), will cause a corresponding rotation of cam wheel 124. The rotation of the cam wheel 124 will cause the cables 120 and 116 to simultaneously pull on both of the latch sliders 134, which in turn causes both of the latch pins 136 to be withdrawn. While either of the latch handles 112 is held in its unlatched position (position B in FIG. 16), the entire load bar assembly 26, and thus also the cargo box assembly 18, can be moved slidably along the tracks 20a of the support rails 20. Preferably the support rails 20 each have a series of holes 20b (FIG. 10b) which are spaced apart (not visible in FIG. 1) along the lengths thereof in which the latch pins 136 can engage. Thus, the load bar assembly 26, and with it the cargo box assembly 18, can be repositioned with in the bed 14 when needed. The entire cargo box assembly 18 can also be moved slidably to a point adjacent the tailgate 23 (FIG. 1), which allows a user to open the lid 62 and access the interior of the cargo box assembly without the need to climb into the bed 14 of the vehicle 12.

If the user wishes to use just the load bar assembly 26 by itself, the user can unlock the key actuated locking assemblies 50 and remove the outer box 30, with the inner box 34 and tray 36 positioned therein, from the load bar assembly 26. The load bar assembly 26 can then be repositioned within the bed 14 as needed by the user lifting either of the latch handles 112 and then sliding the load bar assembly 26 along the support rails 20 to a new position in the bed 14.

While the system 10 is especially well suited to use with pickup trucks, it will be appreciated that it could just as easily be integrated into the interior of SUVs and cargo vans, delivery trucks, crossovers, etc. As such, the system 10 is expected to find use with a diverse collection of vehicles.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A cargo supporting and restraining system for use within a cargo area of a vehicle, the system comprising:
   a pair of support rails fixedly secured to opposing interior wall surfaces of a pair of sidewalls of a vehicle cargo area;
   a load bar assembly having a generally U-shaped frame, and being supported for sliding movement and adjustable positioning along the support rails;
   a locking system associated with the load bar assembly for locking the load bar assembly at a desired longitudinal position along the support rails;
   the locking system including a pair of latching assemblies disposed on lateral opposite sides of the load bar, and at least one manually operable latch release component operably associated with the pair of latching assemblies and configured to simultaneously release the pair of latching assemblies to permit sliding movement of the load bar along the support rails;
   a cargo box assembly removably secured to the load bar assembly; and
   a locking assembly operably associated with the cargo box assembly, for locking the cargo box to the load bar assembly to prevent removal of the cargo box assembly.

2. The system of claim 1, wherein the locking assembly associated with the cargo box assembly comprises;
   a first key actuated locking assembly configured to engage with a first portion of the load bar assembly;
   a second key actuated locking assembly configured to engage with a second portion of the load bar assembly;
   when both of the first and second key actuated locking assemblies are placed in unlocked orientations, the cargo box assembly is able to be removed from the load bar assembly.

3. The system of claim 1, wherein the cargo box assembly is slidably supported on the load bar assembly.

4. The system of claim 1, wherein the locking system associated with the load bar assembly further comprises:
   the at least one latch release component including a first latch handle and a second latch handle; and
   at least one cable operatively connecting the first and second latch handles and being operatively associated with the pair of latching assemblies;
   wherein movement of either one of the first or second latch handles from a latched position to an unlatched position operates to simultaneously release both of the latching assemblies from engagement with the pair of support rails, thus enabling movement of the load bar assembly along the support rails.

5. The system of claim 4, wherein each one of the pair of latching assemblies includes a latching pin which engages within a respective hole in an associated one of the support rails when the load bar assembly is fixedly secured to the pair of support rails.

6. The system of claim 1, wherein the load bar assembly is removable from the support rails.

7. The system of claim 1, wherein the cargo box assembly includes at least one solar panel disposed thereon for receiving solar energy.

8. The system of claim 7, further comprising a rechargeable battery mounted within the cargo box assembly, the rechargeable battery being in communication with the solar panel to enable recharging of the rechargeable battery.

9. The system of claim 8, further comprising a tool recharging port operably associated with the rechargeable battery for enabling recharging of a battery of a tool using the tool recharging port.

10. The system of claim 8, further comprising a universal serial bus (USB) charging port operably associated with the rechargeable battery for enabling charging of a battery of an external device via the USB charging port.

11. The system of claim 1, wherein the cargo box assembly comprises:
an outer box;
a lid pivotally secured to the outer box and being movable between a closed position and an open position; and
a key actuated lock disposed on the lid for locking lid in the closed position.

12. The system of claim 1, wherein the load bar assembly includes at least one tie down loop secured to the frame to enabling an external fastening implement to be secured.

13. A cargo supporting and restraining system for use within a cargo area of a vehicle, the system comprising:
a pair of support rails fixedly secured to opposing interior wall surfaces of a pair of sidewalls of a vehicle cargo area;
a load bar assembly having a generally U-shaped frame, and being supported for sliding movement and adjustable positioning along the support rails;
a locking system associated with the load bar assembly for locking the load bar assembly at a desired longitudinal position along the support rails, the locking system including:
a first latch handle;
a second latch handle; and
at least one cable operatively connecting the latch handles;
at least one latching assembly mounted in a portion of the U-shaped frame of the load bar assembly to secure the load bar assembly at a desired longitudinal position along the support rails; and
wherein movement of either one of the first or second latch handles from a latched position to an unlatched position operates to release the at least one latching assembly from engagement with the support rails, thus enabling movement of the load bar assembly along the support rails; and
a cargo box assembly removably secured to the load bar assembly.

14. The system of claim 13, further comprising a locking assembly operably associated with the cargo box assembly, for locking the cargo box assembly to the load bar assembly to prevent removal of the cargo box assembly.

15. The system of claim 13, further comprising:
an additional latching assembly operably associated with the load bar assembly at a different location from the at least one latching assembly, and movable between latched and unlatched positions; and
wherein movement of either the first or second latch handles from the latched position to the unlatched position simultaneously releases both of the at least one latching assembly and the additional latching assembly, thereby permitting longitudinal sliding movement of the load bar assembly along the support rails.

16. The system of claim 13, wherein the load bar assembly is removable from the support rails.

17. The system of claim 13, wherein the cargo box assembly includes at least one solar panel disposed thereon for receiving solar energy.

18. The system of claim 17, further comprising a rechargeable battery mounted within the cargo box assembly, the rechargeable battery being in communication with the solar panel to enable recharging of the rechargeable battery.

19. The system of claim 18, further comprising at least one of:
a tool recharging port operably associated with the rechargeable battery for enabling recharging of a battery of a tool using the tool recharging port; or
a universal serial bus (USB) charging port operably associated with the rechargeable battery for enabling charging of a battery of an external device via the USB charging port.

20. A cargo supporting and restraining system for use within a cargo area of a vehicle, the system comprising:
a pair of support rails fixedly secured to opposing interior wall surfaces of a pair of sidewalls of a vehicle cargo area;
a load bar assembly having a generally U-shaped frame, and being supported for sliding movement and adjustable positioning along the support rails;
a locking system associated with the load bar assembly for locking the load bar assembly at a desired longitudinal position along the support rails, the locking system including:
a first latch handle;
a second latch handle; and
at least one cable operatively connecting the latch handles;
at least one latching assembly mounted in a portion of the U-shaped frame of the load bar assembly to secure the load bar assembly at a desired longitudinal position along the support rails; and
wherein movement of either one of the first or second latch handles from a latched position to an unlatched position operates to release the at least one latching assembly from engagement with the support rails, thus enabling longitudinal movement of the load bar assembly along the support rails; and
a cargo box assembly slidably supported on first and second portions of the frame of the load bar assembly, the cargo box assembly being removably secured to the load bar assembly for removal from the load bar assembly;
a lid pivotally secured to the cargo box assembly and movable between an open position and a closed position;
a locking mechanism disposed on the lid for locking the lid in a closed position;
a solar panel disposed on the lid;

a rechargeable battery disposed in the cargo box assembly and in electrical communication with the solar panel to be recharged by the solar panel; and a charging port operably associated with the rechargeable battery.

* * * * *